United States Patent [19]

Angelini

[11] Patent Number: 4,727,567

[45] Date of Patent: Feb. 23, 1988

[54] OPERATOR STATION FOR TELEPHONE EXCHANGE

[75] Inventor: Franco Angelini, Ivrea, Italy

[73] Assignee: Ing. C. Olivetti & C., S.p.A., Ivrea, Italy

[21] Appl. No.: 709,192

[22] Filed: Mar. 7, 1985

[30] Foreign Application Priority Data

Mar. 7, 1984 [IT] Italy .............................. 67207 A/84

[51] Int. Cl.[4] ............................................... H04M 1/00
[52] U.S. Cl. ...................................... 379/52; 379/267; 340/700; 340/713; 340/805
[58] Field of Search .......... 179/7.1 TP, 18 AD, 18 B, 179/49 R, 99 A, 99 LS; 379/52, 165, 157, 260, 261, 262, 263, 264, 265, 266, 267, 387, 396; 340/700

[56] References Cited

U.S. PATENT DOCUMENTS

| | | | |
|---|---|---|---|
| 3,175,039 | 3/1965 | Wilbourne | 179/7.1 TP |
| 3,794,783 | 2/1974 | Radu | 179/7.1 TP |
| 3,920,911 | 11/1975 | Lukas | 179/7.1 TP |
| 4,264,956 | 4/1981 | Delaney | 179/7.1 R X |
| 4,371,752 | 2/1983 | Mathews et al. | 179/7.1 TP |

FOREIGN PATENT DOCUMENTS

2846786 4/1980 Fed. Rep. of Germany ...... 340/700

OTHER PUBLICATIONS

T. M. Bauer et al., "New Job Opportunities for the Visually Impaired", Telephony, Feb. 21, 1983, pp. 101, 102, 104, 106.

*Primary Examiner*—James L. Dwyer
*Attorney, Agent, or Firm*—Banner, Birch, McKie & Beckett

[57] ABSTRACT

The operator station comprises a series of manual controls on a keyboard for handling calls, some of which are provided with a visual LED indicator, and an alphanumeric display (53) for the items of information necessary to the operator for handling calls. The operator station further comprises a voice synthesizer (100) for messages corresponding to the above-mentioned items of information, which is activated by the controls of the operator station to permit a blind operator to operate the exchange. The keyboard comprises two additional keys for respectively controlling the emission of a message relating to the status of the exchange and repetition of the message relating to the last key actuated by the operator. The operator station further comprises two manual adjusting members (108 and 106) respectively for the speed of the synthesizer and for the volume of the voice message. Another adjusting member (85) provides for regulating the control voltage of the display to define the optimum angle of display for a sighted operator. The display is also variably inclinable on the cover of the operator station, which also incorporates a paper tape printer for printing the data in respect of telephone connections and the changes relating thereto.

3 Claims, 5 Drawing Figures

OPERATOR STATION FOR TELEPHONE EXCHANGE

BACKGROUND OF THE INVENTION

The present invention relates to an operator station for a telephone exchange, comprising a line selection means, an array of manual controls for handling calls, and visual display means for the items of information necessary to the operator for handling calls.

Telephone exchanges for private use, which are generally known by the abbreviation PABX, have been largely automated by application of digital electronic technology, and have acquired a range of additional facilities. Nevertheless they still generally require the assistance of an operator for dealing with a series of operations, whether in regard to calls from the public system, or in regard to diagnostic operations. Such action must take account of the status or condition of the exchange and the type of call, which are generally indicated to the operator by visual means such as telltale lamps and/or an alpha-numeric display.

Whenever there is a wish to employ blind or poorly-sighted persons as operators, in some operator stations for telephone exchanges, the visual indicator means are replaced by acoustic indicator means, for example by means of buzzers producing various tones.

For more sophisticated exchanges wherein the types of operation require a high number of indications to be provided for the operator, it is not possible to replace all the visual indicator means required, by the same number of buzzers.

SUMMARY OF THE INVENTION

The object of the present invention is to provide an operator station for telephone exchanges, which is capable of being operated both by sighted operators and by blind operators, substantially without limits in regard to the number of indications to be supplied to the operator. To this end, the operator station according to the invention is characterised by a console carrying the numeric keys and the control keys and having a cover housing a voice synthesizer means for messages corresponding to the items of information necessary for the operator for handling the station, these means being selectively activatable by a pair of additional control keys depressible to permit the exchange to be handled by a blind operator.

In accordance with another feature of the invention, the visual means comprise a liquid crystal-type alpha-numeric display whose control voltage is adjustable by hand by means of a potentiometer so as to define the optimum angle of display for a sighted operator, a support for the display being hinged with a substantial amount of friction about a horizontal axis on the cover of the operator station so as to be manually inclined variably about the said axis.

In accordance with a further feature of the invention, the operator station comprises a tape-type alpha-numeric printer which is incorporated in the cover of the operator station, a unit for computing the charges according to the tariffs controlling a central unit of the operator station thereby selectively to control the printing of the messages for dealing with the connections and/or the documents for charging in respect of connections.

BRIEF DESCRIPTION OF THE DRAWINGS

The invention will be described in more detail by way of example with reference to the accompanying drawings, in which.

DESCRIPTION OF THE PREFERRED EMBODIMENTS

Figure 4:
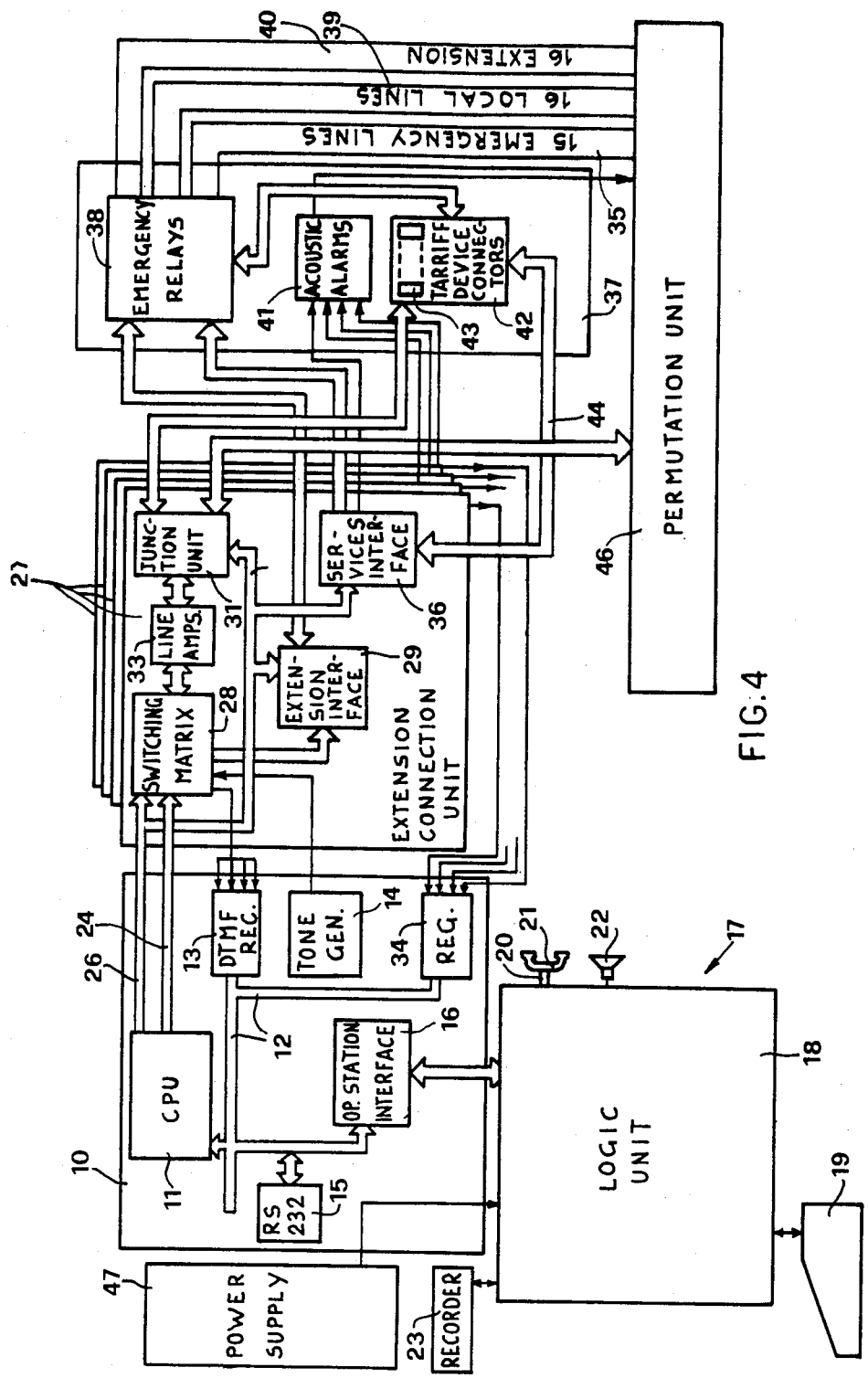
FIG. 4 is a block diagram of the telephone exchange.

The invention is applied to a telephone exchange of space division type for private systems, which will be referred to hereinafter as a PABX, which is operable selectively to connect a certain number of users, either user-to-user by way of a series of internal lines ("extensions") or with a public system by way of one or more outside lines (exchange lines). The PABX comprises a control unit 10 (see FIG. 4) which comprises a central microprocessor-type processing unit or CPU 11 provided with a working RAM and a program ROM and connected by way of a bus 12 to a series of multi-frequency receivers (Dual Tone Modulation Frequency DTMF) 13 for special users, the status of which is periodically sampled to identify the services required by the users. The PABX further comprises a tone generator 14 for the acoustic signals used to effect connections. Also connected to the bus 12 is an RS 232 interface 15 for the interchange of information with an optional piece of apparatus for controlling auxiliary services, such as a multi-function work station or a data transmission apparatus.

Figure 1:
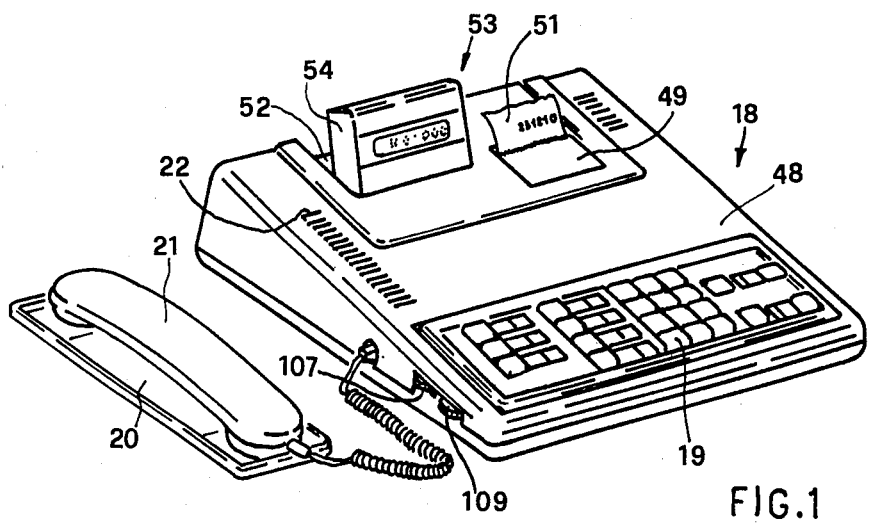
FIG. 1 is a perspective view of an operator station for a telephone exchange according to the invention.

A second interface 16 serves for current loop connection of the central unit 11 to the operator station which is generally denoted by reference numeral 17. As will be more clearly seen hereinafter, the operator station comprises a logic unit 18, a control keyboard 19 and a cradle 20 with associated telephone handset 21 (see also FIG. 1). A loudspeaker 22 and a recorder 23 for playing music while waiting for a connection to be made may also optionally be connected to the operator station 17.

The central processing unit 11 further comprises an address bus 24 and a data bus 26 for connection to the internal or branch user connections. Such connections are organized in up to four modular units 27, each of which comprises an analog switching matrix 28 of time division type for the connections, which is connected to the central unit 11 by means of the buses 24 and 26. Each unit 27 further comprises an interface 29 for sixteen extensions and a four line junction unit 31 for the outside public system, being connected to the matrix 28 by way of a series of line amplifiers 33. A register 34 which is connected to the bus 12 of the central unit 11 is predisposed by the individual units 27 so as to signal the presence of the units 27 to the central unit 11. Finally, each unit 27 comprises an interface 36 with a services unit 37 of the PABX. The interfaces 29, 31 and 36 are connected to the matrix 28 and to the central unit 11 by way of the data bus 26.

The services unit 37 is common to the four units 27 and comprises a relay circuit 38 which is arranged to handle emergencies, for example for system failure. In the event of an emergency, the circuit 38 effects switching of the town junctions provided by a local or town line bus 39 to a part of the branch users, which are provided by an internal line bus 40, by way of a series of emergency lines 35.

The unit 37 also comprises a control circuit 41 for acoustic alarms, which is controlled by the central unit 11 to supply the signals for energizing such alarms, for example in the night service mode of the PABX.

Finally, the unit 37 comprises a bank of connectors 42, for a series of tariff devices 43, one for each outside line. The devices 43 are suitable for permitting detection of the pulses for determining the tariff in respect of outside telephone calls and for communicating the data by way of a bus 44 and the interface 36 to the central unit 11.

The PABX further comprises a permutation unit 46, the function of which is to provide for permutation of the internal and external lines and separation of all the lines. The unit 46 thus comprises the designations of the external lines, and those of the internal users, and is of the same modularity as the user connection units 27. Finally, the PABX comprises a power supply 47 for generating the voltages for supplying the logic circuits, the telephone power supply voltages, the call current and the voltage for supplying the operator station 17.

The logic unit 18 and the keyboard 19 of the operator station are enclosed in an ergonomic cover 48 (FIG. 1) so as to form a desk-top piece of equipment.

The cover 48 encloses an alpha-numeric printer 49 and which, as will be seen hereinafter, is operable selectively to print on a paper tape 51 which issues from an aperture of the cover 48, the messages relating to handling of telephone connections, as well as a charge document including the data and the duration of the connection and the amount relating thereto. The printer 49 may be of any known type. By way of example, the printer 49 may be of the series-parallel thermal type, substantially as described in the present applicants' Italian patent No. 1 000 641.

Figure 3:
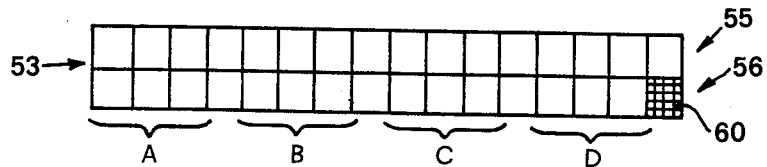
FIG. 3 is a diagrammatic view of the visual display device of the operator station shown in FIG. 1.

Disposed in a recess 52 in the cover 48 is a visual display device 53 having a support 54 which is hinged with a substantial amount of friction about two horizontal pins (not shown) which are disposed in the recess 52. The support 54 can be manually inclined to assume variable positions, by overcoming the friction of the hinge means, in order to adjust the display to suit the operator. The display device 53 (see FIG. 3) is of the liquid crystal type and is operable to display alpha-numeric messages for the operator in two lines 55 and 56 each of sixteen characters, as will be seen in greater detail hereinafter.

Figure 2:
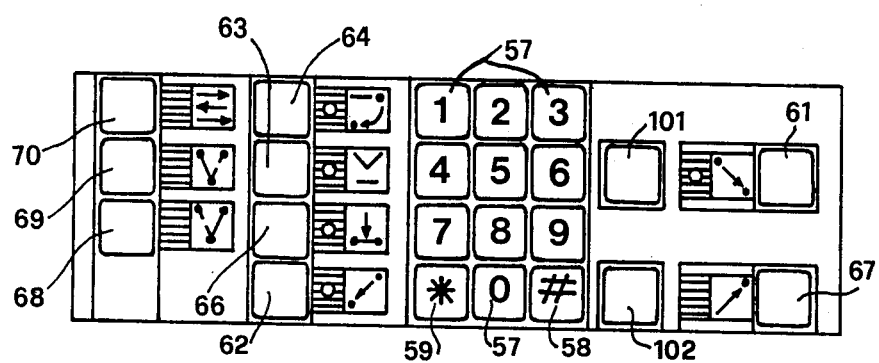
FIG. 2 is a plan view of the keyboard of the operator station shown in FIG. 1.

The keyboard 19 (see FIG. 2) comprises the usual ten numeric keys 57 for line selection and various service codes, a key 58 for controlling the automatic repetition of the last outside number called, and a key 59 for arranging for particular modes of operation of the PABX. Such modes are activated by selecting suitable numeric codes after depressing the key 59 and comprise the night service, alarm diagnosis, line restoration and a series of man-machine interface (MMI) service modes, such as user activation and deactivation, updating or redefinition of the condition of the user, etc.

The keyboard 19 further comprises an array of five control keys, each associated with a visual indicator formed by a LED, indicated by a circle beside the symbol of the key. That array of keys comprises a key 61 for directly taking an outside call or for taking a call followed by a transfer from a branch user, a key 62 for taking a call from an extension or for selecting the extension, a key 63 for taking an outside call with controlled wait to permit automatic transfer when the extension is free, a key 64 for chain transfer of an outside call to permit the operator to pick up the call again after connection to an extension, and a cut-in key 66 to permit the operator to cut into a conversation which is taking place.

The keyboard 19 further comprises another array of operator keys which are not provided with a visual indicator and which are provided for controlling the connections. This array of keys comprises a key 67 for transfer of a communication to a user selected by means of the keys 57, two keys 68 and 69 for releasing the caller and the called person respectively, and an alternate return key 70 to permit the operator to connect alternately to the calling outside subscriber and to the called extension before transferring the call. As will be seen in greater detail hereinafter, all the keys 57 to 70 are capable of providing for visual display of a corresponding message on the display device 53.

Figure 5:
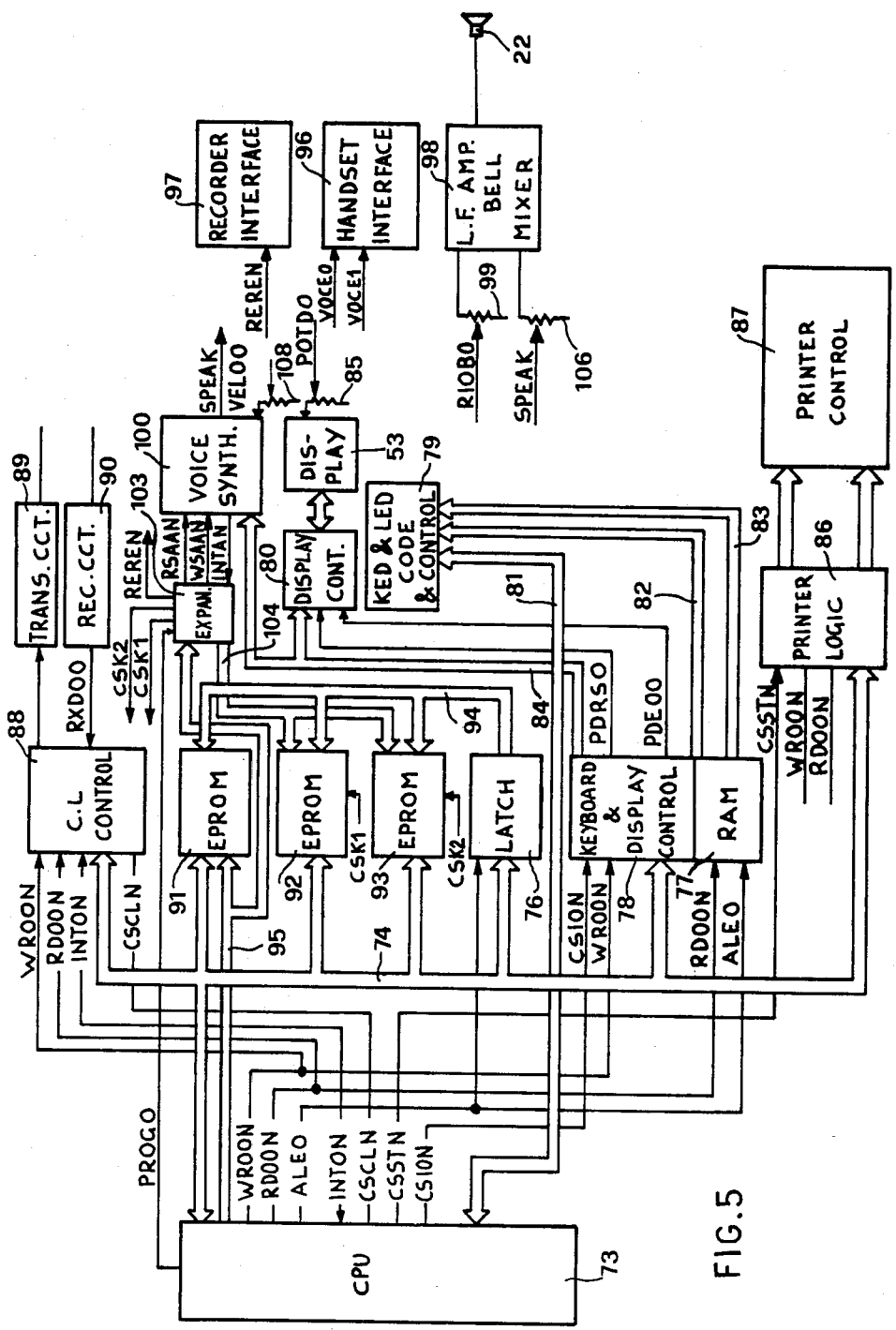
FIG. 5 is a block diagram of the logic circuits of the operator station.

The logic unit 18 of the operator station comprises a central processing unit (CPU) 73 (see FIG. 5), which for example comprises the 8 bit 8035 CPU which is commercially available from Intel. The CPU 73 is connected by means of a bus 74 to a latch register 76, a working memory RAM 77 and a logic circuit 78. The latter serves for managing a coding and control circuit 79 of the keyboard 19 (see also FIG. 1) and the associated LED indicators, and also for managing a circuit 80 for controlling the display 53. The circuit 78 and the RAM 77 are integrated in a single chip which may be an Intel 8155 chip.

The circuit 79 is also connected directly to the CPU 73 by means of a key coding bus 81 while by means of a bus 82 for enabling of the keys of the keyboard 19 and a bus 83 for pilot control of the LEDs, it is connected to the circuit 78 and to the RAM 77. In turn, the circuit 80 is connected to the circuit 78 and the RAM 77 by means of a bus 84.

The display 53 is made active by supplying the liquid crystals with a given control voltage by means of a signal POTDO. That is applied to a potentiometer 85 which can be adjusted by means of a knob which is disposed on the right-hand side of the keyboard 19 (see FIG. 1) but which is not visible in the drawing. Adjustment of the potentiometer 85 (see FIG. 5) causes a variation in the voltage for controlling the liquid crystals, which causes a variation in the optimum angle of display whereby the operator can adjust the display 53 to his or her habitual position, with respect to the position of the operator station on the desk top.

The bus 74 is also connected to a logic circuit 86 for operating a control means 87 for the printer 49 and to a logic circuit 88 for current loop (C.L.) operation of a transmission circuit 89 and a reception circuit 90 which constitute the interface of the logic unit 18 of the operator station with the interface 16 (see FIG. 4) of the central unit 10 of the PABX. The circuits 86–90 (FIG. 5) are known per se and will therefore not be described in detail herein.

Finally, the bus 74 is connected to a read only memory bank of EPROMs 91, 92 and 93, which are addressed by way of a latch circuit 76 via a bus 94. The EPROM 91 stores the programs and the routines required for the CPU 73, for controlling the PABX, and is connected to the CPU 73 by means of an additional address bus 95.

The logic control unit 18 also comprises an interface 96 for the telephone handset 21 (see also FIG. 4), an interface 97 for the recorder 23 and a mixer 98 for the bell and the low frequency amplifer of the loudspeaker 22.

When the logic circuit 88 receives from the reception circuit 90 a signal RXDOO denoting a call from the outside, it generates an interrupt signal INTON for the CPU 73.

The latter, by means of the signal CSCLN, enables the circuit 88 to pass the data in respect of the call by way of the bus 74. Then, by means of the signal ALEO, it enables the latch circuit 76 to select the EPROM 91 by means of the bus 94. Now, the CPU 73, by way of the bus 95, addresses the EPROM 91 to extract the call management routine which is supplied by way of the bus 74.

The CPU 73, by means of the signals WROON and RDOON and by way of the bus 74, registers and reads from the RAM 77 the data in respect of the call and the data which are processed to control the various functions and the various peripheral units. Then, by means of the signal CSION, the CPU 73 causes the circuit 78 to generate a signal PDRSO which, by way of the bus 84, causes transfer to the circuit 80 for controlling the display 53, of the data in respect of the caller and the called party-which are to be displayed. An item of data of the display 53 may be transferred circuit 80 from the RAM with an enabling signal PDEOO.

The circuit 80 is conditioned by the signal PDRSO so as to cause display on the first line 55 thereof (see FIG. 3) of the data in respect of the type of call while displayed in the second line 56 are the data relating to the caller or the called branch extension. Displayed in each line are four fields A, B, C and D, each of three characters, separated by a space character. In particular in connections to the outside, in the first line 55 the field A displays one of the following groups of letters to indicate the type of call: URB=outside or town, RIT=return from extension, CAT=chain return, RIN=transfer back from extension, TRA=transfer from one extension to another. The field B displays the number of the outside line used while in the case of the letters RIT and RIN in the field A, the field C displays the group of letters INT=branch extension and the field D indicates the number of the branch extension from which the outside call which is returned or transferred back originates.

The second line 56 generally displays the data in respect of the calling extension in the case of a call which is made to the outside.

In particular, in the line 56 the field A displays the number of the branch extension, the field B displays the type of call with the groups of letters: IND=indirect, DIR=direct, the field C displays the class of extension with the groups of letters: DIS=disabled, AB1=semi-enabled, AB2=local enabled, AB3=trunk enabled, AB4=international enabled. Finally, the field D indicates other information relating to the branch extension, for example the group of letters BLO=block on cutting-in. In regard to internal calls, the data in the first line 55 may display the data in respect of the inside person called and represent the data constituting the opposite number to the data in the second line. The two lines 55 and 56 may also indicate other information relating to the connections not listed above, in particular in regard to connections for the night service or multiple connections (party connections or for a conference). In addition, the two lines 55 and 56 may indicate a series of items of information relating to failures or breakdowns when the PABX is in a reconfiguration or diagnostic condition.

Finally, the second line comprises a special character 60 (for example in the form of a grid) which is always visible and stable in a condition of normal service and which goes into a flashing mode in the situation of what is referred to as a "minor alarm", that is to say, problems which require the attention of the operator but which do not totally prejudice operation of the PABX. If however the character 60 goes out, that indicates to the operator what is referred to as the "major alarm" whereby it is not possible to operate with the PABX without having dealt with the fault in question.

Whenever a telephone connection requires intervention on the part of the operator, the data and the commands which are keyed in on the keyboard 19 and coded by the circuit 79 are passed to the CPU 73 by way of the bus 81. In response, the RAM 77, by way of the bus 83, causes the LEDs of any key 61–66 which has been actuated to be lit, thus giving the operator a visual indication of the command which has been carried out. In addition, depending on the status of the PABX, and the commands which are keyed in at the keyboard 19, the CPU 73, by means of another signal CSCLN, conditions the circuit 88 to pass to the circuit 89 the serial data of the connection to be transmitted to the central unit 10. Finally, the CPU 73, generating a signal CSSTN, enables the logic circuit 86, for control of the printer 49 (see FIG. 1) by means of the control unit 87. The PABX may be programmed in such a way as to cause the data of the connections made to be selectively printed. For example, it may be programmed to cause printing of all the connections to outside lines, or all out-of-city connections. In that case, at the end of the connection, the central unit 10 (see also FIG. 4) supplies, by way of the microprocessor 11 and the circuits 90 and 88, the number of units detected by a tariff device 43, calculates the charge and actuates the circuit 86 in such a way as to cause the printer 49 (see FIG. 1) to print, together with the data in respect of the connection, the above-mentioned units and the amount corresponding thereto. The operator can then remove the printed document issuing from the cover 48 in order suitably to sort it.

The control unit 10 may also be programmed so as to cause information relating to faults, reconditioning operations and diagnosis to be printed on the tape 51.

It will be appreciated that the operator may intervene in conversations by means of the keyboard 19. In that case, the keyboard 19 causes the circuit 79 (FIG. 5) to generate a cut-in signal for the CPU 73 which handles it together with any other cut-in signals due to emergencies, on the basis of relative priorities. Finally, the CPU 73 selectively enables the signals VOCEO and VOCEI of the voice channels of the telephone handset, at the interface 96. At the interface 97, a signal RENEN permits insertion in the connection of the music from the recorder 23 when a caller is waiting and at the mixer 98 the bell signal RIOBO. The latter is applied by means of a manually controllable potentiometer 99 to control the input volume of the call bell.

In accordance with a feature of the invention, the logic unit 18 comprises a voice synthesizer 100 which is selectively activatable by means of two additional keys 101 and 102 (see FIG. 2) of the keyboard 19, for the emission of voice messages which are recorded in digital form, to permit blind persons to act as PABX operators. In particular, the key 101 serves to produce the emission or repetition of the message relating to the status of the operator station, that is to say, the type of call or connection to be made. The key 102 serves to cause repetition of a message relating to the last key 57–70 pressed by the operator.

The synthesizer 100 is of the linear predictive code type (LPC) and comprises an internal read-write memory or RAM into which are loaded the data in respect of the selected message which are synthesized by an array of filters at suitable intervals of time in such a way as to produce a continuous emission of the word or phrase. By way of example, the synthesizer may comprise the unit TMS 5220 which is marketed by Texas Instruments.

The voice messages are recorded in digital form in the EPROMs 92 and 93, each of which has a capacity of 8K×8. Such messages include those regarding the status of the operator station, which correspond to the items of information available on the LEDs of the keyboard and on the display 53 and are selected by depressing the key 101. The recordings in the EPROMs 92 and 93 further include the messages which confirm the sequence of operations that the operator has performed, that is to say, those relating to the last key pressed by the operator, and are always selected and can be repeated by depressing the key 102. In particular, the words or phrases recorded in the EPROMs 92 and 93 for blind operators which also make it possible to have the time and the date are set out in the following table. The words and phrases are selected in accordance with Italian telephone usage. Obviously the words and the language thereof will be selected according to the intended market.

REREN for the interface 97 is generated in the circuit 103. The synthesizer 100 is in turn addressed by the circuit 78 by means of the bus 84 and is capable of emitting a voice signal SPEAK which by way of a potentiometer 106 controls the low frequency amplifier 98. The potentiometer 106 is adjusted by means of a knob 107 (see FIG. 1) disposed on the left-hand side of the keyboard 19 and serves to regulate the volume of the voice messages.

By setting the knob 107 to the minimum setting, a sighted operator can completely cut out the output at the loudspeaker 22 in respect of messages related to the depressed keys. The synthesizer 100 (FIG. 5) is also controlled by an internal oscillator which is under the control of a signal VELOO provided by another potentiometer 108 for adjusting the speed of the speech. The potentiometer 108 is adjusted by means of another knob 109 (FIG. 1) which is disposed on the side of the keyboard.

The messages relating to the keys 57–70 as they are depressed are selected by the CPU 73 from the EPROMs 92 and 93 simultaneously with the characters of the displayed items of information. Upon depression of the key 101 or the key 102, the synthesizer 100 emits an interrupt signal INTAN which, by way of the expander circuit 103, is passed to the CPU 73. In reply, the CPU 73 emits a signal PROGO which enables the expander circuit 103. In any case, based on the data of the bus 95, the expander circuit 103 selectively emits the signals CSK1 and CSK2 to select the EPROM 92, 93 in which the portions of the message to be synthesized are found. The EPROM 92, 93 which is selected in that way is addressed by way of the bus 104 and the bus 94 and the data extracted are passed by way of the bus 74, the RAM 77 and the bus 84 to the synthesizer 100.

The CPU 73 then causes the expander circuit 103 selectively to emit the read and write signals RSAAN

| CITY | | ERROR | | NIGHT |
| --- | --- | --- | --- | --- |
| RETURN | | ALARM | | RETURN |
| TRANSFER | | FREE | | GENERAL |
| RESUME | | OCCUPIED | | ADVICE |
| WAITING | | ENABLED | | INDIVIDUAL |
| TRANSFER ON | | INCLUSION | | FAULT |
| PARTY | | BARRED | | CLICKS |
| LINE | | DIRECT | | SPEED |
| RELEASE | | INDIRECT | | GROUP |
| CALLER | | ZERO | | DIAGNOSIS COMPLETED |
| PARTY CALLED | | BRANCH | | CONTACTS DAMAGED |
| PERFORMANCE | | INTERNAL | | REENABLE LINE |
| ACTIVE | | DIAGNOSIS | | LINE STATUS |
| CHAIN | | SERVICE | | THE TIME IS |
| ZERO | ONE | | TWO | THREE |
| FOUR | FIVE | | SIX | SEVEN |
| EIGHT | NINE | | TEN | ELEVEN |
| TWELVE | THIRTEEN | | FOURTEEN | FIFTEEN |
| SIXTEEN | SEVENTEEN | | EIGHTEEN | NINETEEN |
| TWENTY | TWENTY ONE | | TWENTY EIGHT | |
| THIRTY | THIRTY ONE | | THIRTY EIGHT | |
| FORTY | FORTY ONE | | FORTY EIGHT | |
| FIFTY | FIFTY ONE | | FIFTY EIGHT | |
| SIXTY | SIXTY ONE | | SIXTY EIGHT | |
| SEVENTY | SEVENTY ONE | | SEVENTY EIGHT | |
| EIGHTY | EIGHTY ONE | | EIGHTY EIGHT | |
| NINETY | NINETY ONE | | NINETY EIGHT | |

The EPROMs 92 and 93 and the synthesizer 100 are controlled by the CPU 73 by way of an expander circuit 103 having four input-output gates, each of four bit type. In particular, the circuit 103 is connected to the CPU 73 by means of the bus 95 while by means of a bus 104 it is capable of passing to the EPROMs 92 and 93, the most significant bits of the address. The signal and WSAAN respectively to control, by way of the RAM which is internal to the synthesizer 100, the parameters of the filters which produce voice synthesis of the messages.

Two examples of connections which are handled by a blinded operator will now be described.

It will be assumed that a city call on line "01" is to be transferred on to the branch extension "302". At the sound of the acoustic signalling device, the operator asks for the status of the PABX by means of the key 101 (see FIG. 2) and obtains the voice message "CITY". The operator depresses the key 61 for taking the call and receives the voice message "CITY ZERO ONE", while he or she is telephonically connected to the caller. The caller now asks to be connected to extension "302" which the operator selects by means of the keys 57, receiving the messages "THREE", "ZERO", "TWO". By means of the telephone handset, he obtains the status tone (free or engaged) of the extension called. If he wants further information on the extension called, he presses the key 101 and obtains for example the voice messages "CITY ZERO ONE", "THREE ZERO TWO", "FREE", "ENABLED FOUR", "INCLUSION BARRED". In that way, he obtains complete information in regard to the activity which is taking place.

The extension replies to the call and the operator informs the party on the extension of the call for that party. The operator now presses the key 67 (transfer) and receives the message: "TRANSFER". The call is transferred to the extension 302. If the operator presses the key 102, he receives a repetition of the message "TRANSFER" which refers to the last key that the operator pressed.

It will now be assumed that extension "302" requires a number in the city system. The call on the extension is signalled to the operator station by means of an acoustic warning device. The operator presses the key 101 to ask for the status of the system and receives the message "INTERNAL". The operator takes the call by pressing the key 62 (taking an internal call) and obtains the voice message "THREE ZERO TWO", being connected to the extension.

If the operator wants further information regarding the calling extension, the operator presses the key 101 and obtains for example "THREE ZERO TWO", "ENABLED FOUR", "INCLUSION BARRED";

The extension wants the number 0125522731.

The operator presses the key 0 (numeric key 57) and receives the message "CITY". He selects 05 and receives the message "CITY ZERO FIVE", engaging the corresponding city line. He now selects the digit of the number required and obtains the corresponding voice messages. He now receives the ringing tone and, when the subscriber replies, he presses the key 67 (transfer), obtains the message "TRANSFER", and the extension is connected to the number required.

The voice synthesizer is tested during self-diagnosis of the operator station. The result of correct operator comprises the emission of the phrase "DIAGNOSIS COMPLETED". During the diagnostic phase, both in respect of the operator station and in respect of the PABX, a special tone is produced to signal the condition of diagnosis being conducted.

At the end of the diagnosis operation, if it is concluded without disastrous faults being detected, the message "NIGHT SERVICE ACTIVE" will be obtained and the special tone is cut off. In the event of disastrous faults being detected, being equivalent to the major alarm situation, a continuous tone will be emitted.

During normal operation, signalling of a "minor alarm" is effected by means of the emission of the voice message "ALARM". That messages is repeated whenever the operator calls for the status of the system, by means of the key 101.

Signalling of a "major alarm" is effected by means of the emission of the continuous tone.

It will be appreciated that the operator station described hereinbefore may be the subject of various modifications and improvements without departing from the scope of the invention. For example, the speed of the voice synthesizer 100 may be controlled in digital form by means of codes, rather than by means of the knob 109. In that case, the voice synthesizer 100 may be predisposed to be controlled with a finite number of timings, for example five, which can be selected after having depressed the key 59 and the speed code relating thereto, which will cause the synthesizer to emit the word speed. The key from 1 to 5 which is indicative of the speed selected in turn causes the synthesizer 100 to emit the number voice message relating thereto.

I claim:

1. An operator station for a private telephone exchange system for a plurality of telephone user lines, comprising voice synthesizer means for generating output signals of audible messages to enable a blind operator to manage said station, and an operator console carrying a cluster of depressible numerical keys for generating signals defining the telephone number of the user to be called, a group of depressible control keys operable for generating commands to handle the telephone exchanges, status indicating means conditionable for generating indications of the status of said exchange, visual display means, including an alphanumeric display for displaying items of information corresponding to said signals, commands and indications so generated, said operator console having a cover housing a central processing unit for causing said alphanumeric display to display in alphanumeric form said items of information, a read only memory permanently storing in digital form a predetermined number of said audible messages corresponding to said items of information, addressing means controlled by said central processing unit to cause the item of information generated by said numerical keys, said control keys and said status indicating means to address said read only memory to select the stored message, and a working memory controlled by said central processing unit for temporarily storing the data of the so addressed message in digital form and for selectively extracting said data and supplying them to said voice synthesizer means, said operator console also carrying a first additional control key depressible for causing said central processing unit to control the extraction from said working memory of the data of a message relating to the status of the operator station, and a second additional control key depressible for causing said central processing unit to extract the data of the audible message corresponding to the signals and commands of the last depressed key for repeating the corresponding audible message, the audible messages corresponding to said signals and commands being automatically extracted from said working memory upon depressing the corresponding numerical key and control key.

2. An operator station according to claim 1, wherein said synthesizer means is adapted to feed with its output signal through an amplifier to a loudspeaker housed into said cover, said console carrying a first manual control operable to act through a potentiometer on said output signal both to switch out said loudspeaker and to adjust the volume with which said loudspeaker emits said audible message.

3. An operator station according to claim 2, wherein said console carries a second manual control operable for adjusting the speed of emission of the messages by said synthesizer means, said second manual control acting on a timing unit to select said speed in digital form among a group of predetermined speeds.

* * * * *